(12) United States Patent
Stolch et al.

(10) Patent No.: US 10,738,873 B2
(45) Date of Patent: Aug. 11, 2020

(54) DEVICE AND METHOD FOR VIBRATION DAMPING IN CONVEYOR DRIVES

(71) Applicant: VOITH PATENT GMBH, Heidenheim (DE)

(72) Inventors: Heiko Stolch, Lauchheim (DE); Daniel Hornberger, Feuchtwangen (DE); Peter Vogel, Crailsheim (DE)

(73) Assignee: Vioth Patent GmbH, Heidenheim (DE)

(*) Notice: Subject to any disclaimer, the term of this patent is extended or adjusted under 35 U.S.C. 154(b) by 190 days.

(21) Appl. No.: 15/766,640

(22) PCT Filed: Oct. 5, 2016

(86) PCT No.: PCT/EP2016/073707
§ 371 (c)(1),
(2) Date: Apr. 6, 2018

(87) PCT Pub. No.: WO2017/063920
PCT Pub. Date: Apr. 20, 2017

(65) Prior Publication Data
US 2018/0283523 A1    Oct. 4, 2018

(30) Foreign Application Priority Data
Oct. 15, 2015   (DE) .................... 10 2015 220 030

(51) Int. Cl.
*F16H 57/00*     (2012.01)
*B65G 27/28*     (2006.01)
*F16H 57/02*     (2012.01)

(52) U.S. Cl.
CPC .......... *F16H 57/0006* (2013.01); *B65G 27/28* (2013.01); *F16H 2057/02034* (2013.01);
(Continued)

(58) Field of Classification Search
CPC .......... F16H 57/0006; F16H 2057/0012; F16H 2057/02034; F16H 2057/02069;
(Continued)

(56) References Cited

U.S. PATENT DOCUMENTS

| | | | |
|---|---|---|---|
| 2,502,564 A * | 4/1950 | Hansson .................. | A47J 43/08 74/16 |
| 3,338,384 A * | 8/1967 | Carrier, Jr. ............. | B65G 27/32 198/761 |

(Continued)

FOREIGN PATENT DOCUMENTS

| DE | 1118693 A | 11/1961 |
|---|---|---|
| DE | 1148108 A | 5/1963 |

(Continued)

OTHER PUBLICATIONS

Machine translation of DE 2345935 A1 obtained on Dec. 9, 2019.*

*Primary Examiner* — Adam D Rogers
(74) *Attorney, Agent, or Firm* — Laurence A. Greenberg; Werner H. Stemer; Ralph E. Locher

(57) ABSTRACT

A drive system for a conveyor system has an motor and a transmission. One or more clutches can be provided between the motor and transmission. The drive system can be mounted by way of a torque support. In order to reduce vibrations of the drive system, a damper is arranged on the axial motor-side end. If the motor, the transmission and, optionally, other components of the drive system are mounted on a rocker, the damper can be arranged on the motor-side axial end of the rocker.

19 Claims, 3 Drawing Sheets

(52) U.S. Cl.
CPC .............. *F16H 2057/02069* (2013.01); *F16H 2057/02073* (2013.01)

(58) Field of Classification Search
CPC ......... F16H 2057/02073; F16H 57/028; B65G 27/28; B65G 27/32
See application file for complete search history.

(56) References Cited

U.S. PATENT DOCUMENTS

| | | | | |
|---|---|---|---|---|
| 4,199,271 | A | * | 4/1980 | Riedl ........................ B06B 1/16 404/113 |
| 4,356,911 | A | * | 11/1982 | Brown ................... B65G 27/32 198/764 |
| 8,770,389 | B2 | * | 7/2014 | Millard .................. B65G 27/24 198/760 |
| 10,190,670 | B2 | * | 1/2019 | Diaz Berrade ......... F16F 15/08 |

FOREIGN PATENT DOCUMENTS

| | | | |
|---|---|---|---|
| DE | 2345935 | A1 | 3/1975 |
| DE | 102011119045 | A1 | 5/2013 |
| EP | 1693593 | B1 | 9/2008 |
| EP | 2727861 | A1 | 5/2014 |
| GB | 466755 | A | 6/1937 |
| WO | 2014072331 | A1 | 5/2014 |

* cited by examiner

Fig.: 1

DEVICE AND METHOD FOR VIBRATION DAMPING IN CONVEYOR DRIVES

BACKGROUND OF THE INVENTION

Field of the Invention

The invention relates to a drive system for conveyor drives, particularly in belt conveyors, and to a method for damping vibrations on the drive system of a conveyor drive.

SUMMARY OF THE INVENTION

Among other things the company Siemens advertises and markets Flender conveyor belt drives for conveyor belts. The industrial drive systems marketed by Siemens are advertised under the name of Integrated Drive Systems Concepts, or IDS for short. These drive systems comprise a frequency converter, a motor and clutch and a transmission. One disadvantage is that these drives with frequency converters are expensive.

The company Nord Drivesystems advertises a modular drive system, in which the components can be combined to suit customer needs and requirements. The individual components are mounted on a carrier. One disadvantage is that in all drive systems vibrations occur, which may be caused by the interaction of the individual components. In particular, inadmissibly large vibrations can occur due to operating frequencies close to the natural system frequency. The operating frequency is derived from the rated speed of the asynchronous motor. The rated speed of the motor is obtained from the so-called motor synchronous speed and the motor slip (often in the range between 0.5 to 10%).

The company brochure "Driving Greater Performance and Reliability—Belt Conveyor Drive Solutions" put out by Voith Turbo GmbH & Co. KG discloses drive systems designed according to customer requirements. The individual modules of the respective drive system are mounted on a carrier, also referred to as a rocker. The main components of a drive system are the motor, the turbo-coupling, also referred to as a hydrodynamic coupling, at least one connection clutch and the transmission. Besides the components: motor, turbo-coupling and transmission, a drive system may comprise further components, such as a second connection clutch. An industrial brake may furthermore be provided, which serves to brake the drive unit in an emergency and/or as service and stop brake.

The object of the invention is to develop a drive system in which the vibrations occurring are reduced. In particular, the aim is to reduce vibrations that occur perpendicularly to the orientation of the drivetrain.

The inventive solution is characterized by the features of the independent claims. Advantageous embodiments are described in the dependent claims.

The invention relates to a drive system for conveyor systems. The term conveyor systems is in particular taken to mean belt conveyors and chain conveyors. The drive systems for conveyor systems comprise a motor, which is operatively connected to a transmission on the output side. The drive system is supported by means of a torque arm. The motor and the transmission are arranged axially in series, wherein further components, such as clutches, may be arranged between the motor and the transmission. A damper is arranged at the axial motor-side end of the drive system. It has been shown that this position of the damper is capable of effectively reducing the vibrations that occur in the drive system. The vibrations occurring at the motor-side axial end of the drive system are especially large, particularly in a drive system without dampers. Added to this is the fact that this position is easily accessible and fitting the damper thereby presents no problems. In the case of drive systems for underground use, in particular, the overall space perpendicular to the axial extent of the drive system is tight. The motor-side axial end is preferably at a distance from the torque arm. This distance constitutes a lever. This lever serves to enhance the action of the damper. The torque arm is preferably arranged in the area between the center of gravity of the motor and the center of gravity of the transmission of the drive system.

Arranging the damper as an axial continuation to the axial extent of the drive system has proved advantageous, particularly in such drive systems, because the damper is especially effective due to the lever effect. The lever is determined by the distance between the torque arm and the center of gravity of the damper mass. There is the added consideration that no additional overall space is needed perpendicular to the axial extent of the drive system.

In an advantageous embodiment the drive system is vertically supported by means of a torque arm. The vertical direction here is opposed to the weight acting. A horizontal direction is perpendicular to the axial extent of the drive system and to the vertical direction.

In an advantageous embodiment it is proposed to use a damper, which is or can be tuned to different damper natural frequencies in at least two spatial directions. In the event of resonance, the operating frequency preferably corresponds to natural frequency of the system, the damper to the natural frequencies of the drive system in a vertical or horizontal direction perpendicular to the axial extent of the drive system. The natural frequencies of the drive system can be measured and also calculated using the masses, rigidities and the support points of the drive system.

Even in the absence of resonance, it has proved advantageous, for optimizing the vibration behavior, for the damper natural frequency to be tuned to the operating frequency of the drive system. Tuning is performed for maximum reduction of the vibration velocity. The operating frequency is obtained from the rated speed of the asynchronous motor. The rated speed of the motor is obtained from the so-called motor synchronous speed and the motor slip (often in the range between 0.5 to 10%, preferably 0.5 to 3%).

Common motor synchronous speeds for the drive systems are:

| motor synchronous speed | motor rated speed | motor rated frequency or operating frequency |
|---|---|---|
| 3600 $min^{-1}$ | 3240 $min^{-1}$ to 3582 $min^{-1}$ | 54.0 Hz to 59.7 Hz |
| 3000 $min^{-1}$ | 2700 $min^{-1}$ to 2985 $min^{-1}$ | 45.0 Hz to 49.8 Hz |
| 1800 $min^{-1}$ | 1620 $min^{-1}$ to 1791 $min^{-1}$ | 27.0 Hz to 29.9 Hz |
| 1500 $min^{-1}$ | 1350 $min^{-1}$ to 1493 $min^{-1}$ | 22.5 Hz to 24.9 Hz |
| 1200 $min^{-1}$ | 1080 $min^{-1}$ to 1194 $min^{-1}$ | 18.0 Hz to 19.9 Hz |
| 1000 $min^{-1}$ | 900 $min^{-1}$ to 995 $min^{-1}$ | 15.0 Hz to 16.6 Hz |
| 900 $min^{-1}$ | 810 $min^{-1}$ to 896 $min^{-1}$ | 13.5 Hz to 14.9 Hz |
| 750 $min^{-1}$ | 675 $min^{-1}$ to 7461 $min^{-1}$ | 11.3 Hz to 12.4 Hz |

In a preferred embodiment it is proposed to use a damper, the total mass of which is less than 10%, preferably less than 5%, of the total mass of the drive system. The total mass of the damper here does not include the elements that are needed in order to fix the damper to the drive system. Just by adding in this manageable mass, a considerable reduction in the vibrations can be achieved. At the same time the effect of the vibration damping of the damper is intensified due to its position and the operative lever principle. The lever is determined by the distance between the torque arm and the center of gravity of the damper mass.

In an advantageous embodiment the damper has planar support in order to prevent tilting moments. Planar support is taken to mean support with at least three points of support lying in one plane. The plane defined in this way is also referred to as a supporting surface. The planar support serves to prevent the occurrence of tilting moments. It has proved advantageous here for the supporting surface to be arranged parallel to the axial extent of the drive system and the horizontal direction.

In an advantageous embodiment a stand is provided for planar support at the motor-side axial end of the drive system. The stand allows an arrangement of dampers available as standard components, so that the one damper natural frequency is operative in a vertical direction and the other, different damper natural frequency is operative in a horizontal direction of the drive system.

In one embodiment the drive system comprises a rocker for supporting and fixing components of the drivetrain such as the motor and the transmission. It has proved advantageous for the damper to be arranged at the motor-side end of the rocker.

In one embodiment the rocker at the motor-side end is provided with a stand. The stand comprises a planar horizontally and axially oriented stand base plate for planar support of the damper. The base plate affords an especially effective support for the damper. This support serves to prevent the occurrence of tilting moments in the damper. These tilting moments can occur particularly when the damper is connected to the drive system by only one fastener.

In an advantageous embodiment the damper is supported in a vertical direction by a stay. This stay may support the damper directly, or the base plate of the stand may be supported by the stay. This stay contributes to the stability of the connection between the damper and the drive system.

It has proved advantageous to use a damper which comprises a damping element, wherein the damping element is an elastomer having a hardness of 25 to 95 Shore, preferably a hardness of 70 to 80 Shore.

In one embodiment it is proposed to use a damper in which the damping rate D lies in the range from 0.04 to 0.16, preferably 0.07 to 0.15.

It has proved advantageous to provide a rocker for a drive system at an axial end having a stand for a planar support of a damper. The stand is preferably firmly connected to the rocker. Such a connection may be made by means of welding, bolting and/or riveting.

The solution according to the invention is explained below with reference to the figures. In the following exemplary embodiments described in detail below an embodiment having a rocker is shown. In the same way that the damper is fixed to the rocker, the damper could be connected to the housing of the motor of the drive system.

DESCRIPTION OF THE INVENTION

Figure 1:
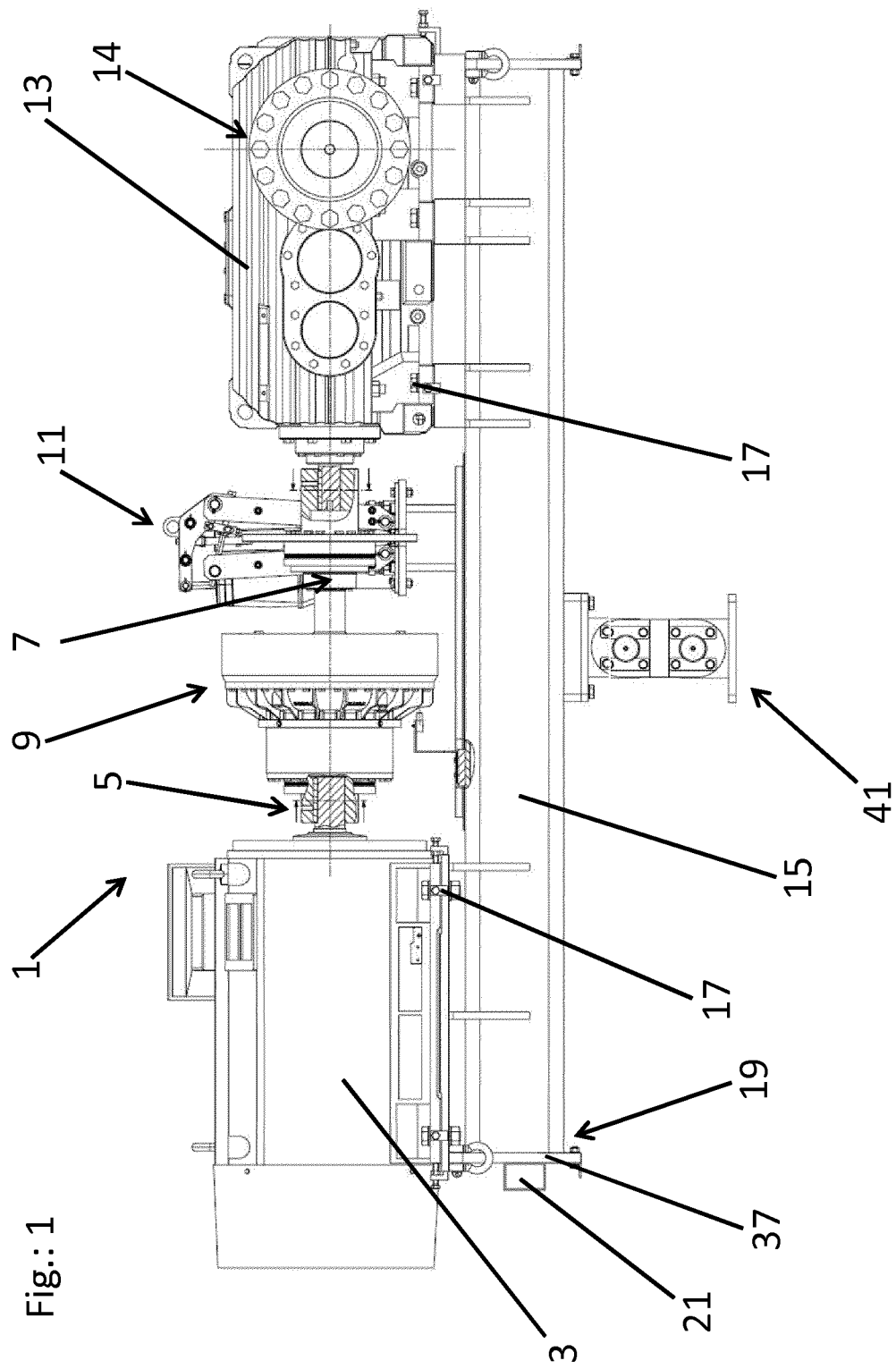
FIG. 1: shows a drivetrain with damper and torque arm

FIG. 1 shows a drivetrain 1. A motor 3 is connected to the hydrodynamic coupling 9 via a connection clutch 5. The hydrodynamic coupling 9 comprises at least an impeller and a turbine rotor. The impeller is connected to an input shaft of the hydrodynamic coupling 9. The rotational movement of the impeller hydraulically drives the turbine rotor and hence the output shaft of the hydrodynamic coupling 9. The hydrodynamic coupling 9, in particular the output shaft of the hydrodynamic coupling, is connected via a second connection clutch 7 to a transmission 13. A brake 11 is arranged between the hydrodynamic coupling 9 and the transmission 13. The brake 11 serves to stop the drive system in an emergency. The brake can also be used as a service and stop brake. In the exemplary embodiment represented the brake 11 is operatively connected to the hydrodynamic coupling 9 by a second connection clutch 7. A connection clutch 14 arranged on the transmission output side constitutes an interface to the end pulley of a conveyor belt or a conveyor chain.

These components are arranged on a carrier 15, hereinafter referred to as a rocker 15, and are firmly fixed to the carrier 15 by fasteners 17. The rocker 15 is supported by a torque arm 41.

At the axial motor-side end 19 of the rocker, the rocker 15 is provided with an end plate 37. At this end a damper 21 is arranged on the rocker 15 for damping vibrations. Vibrations of the rocker 15 are excited by the vibrations from the individual components transmitted to the rocker 15. The static weights acting due to the mass of the individual components also act on the rocker 15.

Figure 2:
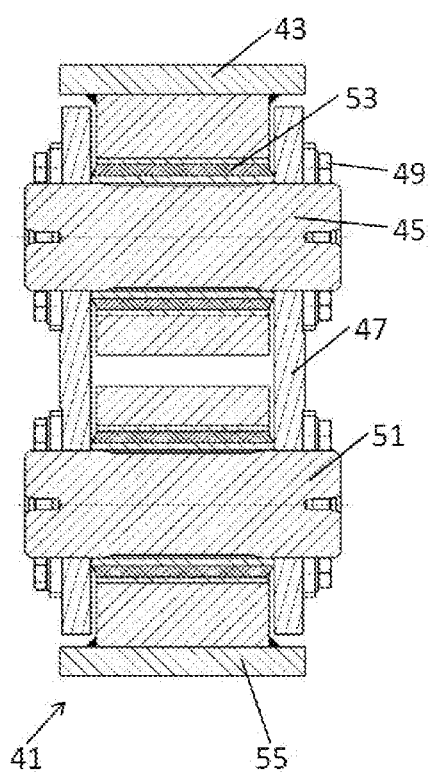
FIG. 2: shows a section through a torque arm
Figure 3:
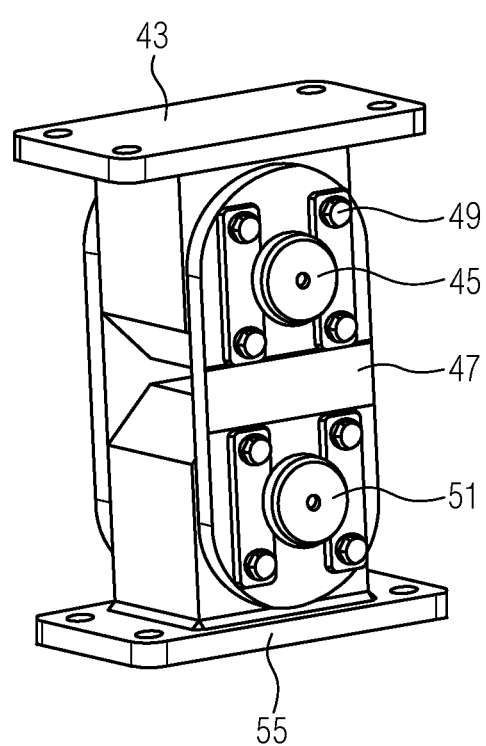
FIG. 3: shows a torque arm

The torque arm 41 is described in more detail with reference to FIGS. 2 and 3. The torque arm 41 comprises an input element 43. The input element 43 can be firmly connected to the rocker 15. In the exemplary embodiment represented a fixed connection is produced by bolting. The input element 43 is supported on a first axis 45, wherein an elastomer sleeve 53 is arranged between the input element 43 and the first axis 45. The first axis 45 is firmly connected to connecting elements 47 on both sides by means of fasteners 49. A second axis 51 is connected to the connecting elements 47 by means of fasteners 49. This second axis 51 is likewise coaxially surrounded by an elastomer sleeve 53, also referred to as a damping sleeve. The second axis is firmly connected to an output element 55 via this elastomer sleeve 53. The output element 55 can be firmly connected to the surroundings. In the exemplary embodiment represented holes are provided, so that a bolt fixing is possible.

The elastomer sleeves 53 assist in damping the vibrations of the rocker 15. Natural rubber (NR/NK), and ethylene acrylate rubber (AEM) and acrylonitrile/butadiene rubber (NBR) have proved particularly suitable as material for the elastomer sleeves 53.

Figure 4:
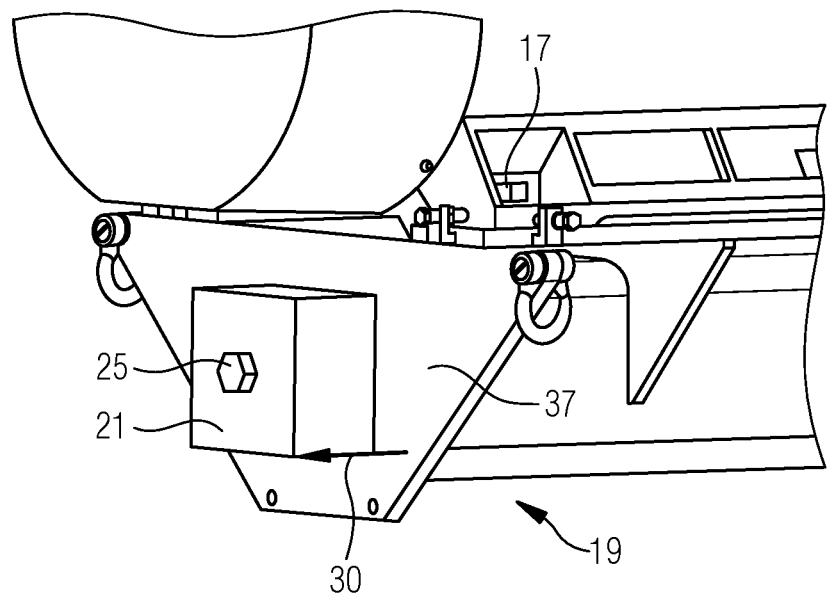
FIG. 4: shows a damper at the axial end of the rocker

The damper 21 is intended to reduce vibrations of the drive system. The damper 21 is arranged at the motor-side axial end 19 of the rocker 15, as shown in FIG. 4. A damper marketed by the company ESM, for example, may be provided as damper Such a damper comprises a main mass 27 in the form of steel plates. These steel plates are connected via an elastomer to a centrally arranged sleeve. Such a damper 21 is a passive damper 21. Passive dampers do not need an additional energy source and are excited to vibrate simply by the system to be damped. In the exemplary embodiment represented the damper 21 is provided with an elastomer as damping element, preferably having Shore A hardness of 70-80. A natural rubber (NR/NK) or an ethylene acrylate rubber (AEM) may be provided as elastomer.

The centrally arranged sleeve constitutes an axial passage and is used for fixing the damper 21. In the exemplary embodiment represented a bolt 25 is provided for fixing the damper 21 to the rocker 15. The central sleeve and hence the bolt run in the Z-direction of the damper 21. The X/Y plane is arranged perpendicular to the Z-direction. The damper acts in all three spatial axes and is thereby triaxial. It is only possible, however, to adjust the damper natural frequencies of the damper 21 in the Z-direction 30 independently of the X/Y-direction. Such dampers can be obtained as standard components, for example from the company ESM.

The axial extent of the damper 21 is arranged in a horizontal direction. It would be desirable to be able to damp the vibrations occurring on the rocker in a horizontal direction and a vertical direction independently of one another. Although currently technically feasible, such dampers with damper natural frequencies adjustable in three axes of one another represent special models and are therefore expensive.

Figure 5:
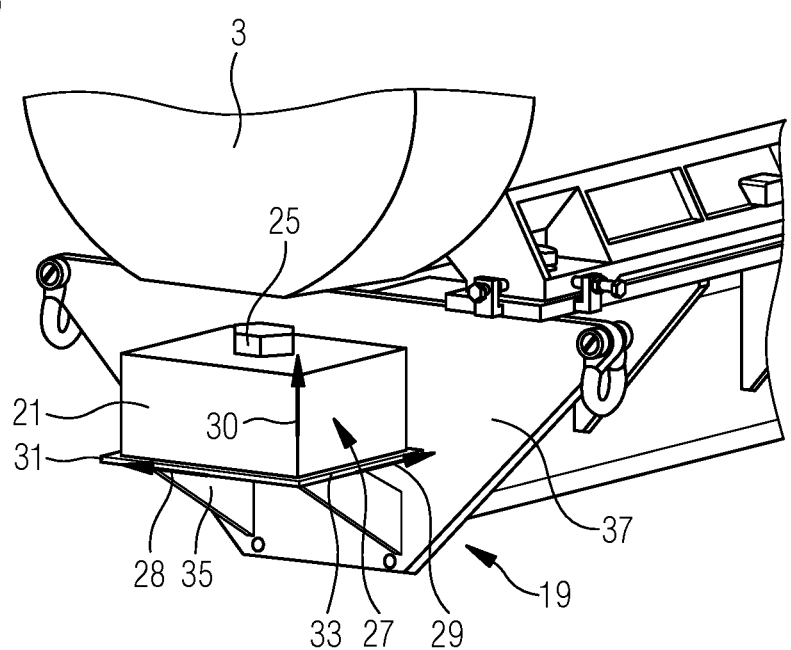
FIG. 5: shows a rocker with a damper supported on one plane

FIG. 5 shows a further exemplary embodiment with a damper 21 previously explained in detail. Compared to FIG. 4, the damper 21 in the exemplary embodiment represented in FIG. 5 is arranged with its Z-direction, Z-direction 30 of the damper 21, in a vertical direction. The Z-direction 30 of the damper 21 in turn corresponds to the orientation of the axial extent of the central bore of the damper 21. A stand 31 having a stand base plate 33 and stand stays 35 is provided for fixing the damper 21. The stand base plate 33 is oriented horizontally. It is thereby possible to use a standard damper 21 with damper natural frequencies adjustable independently of one another in the Z-direction and the X/Y-direction 28, 29.

Ideally, the damper is arranged at the site of the maximum vibration amplitude, in order to exercise the maximum effect. In the exemplary embodiments represented according to FIGS. 4 and 5 the rocker will form its maximum vibration amplitude at the motor-side axial end.

In the embodiment represented in FIG. 5, also, the damper is arranged at the motor-side axial end of the rocker 19. In the embodiment represented in FIG. 5 the damper 21 is supported by means of a stand 31. The stand 31 comprises a stand base plate 33. The stand base plate 33 is arranged horizontally. Stand stays 35 serve to connect the stand base plate firmly to the rocker 15.

LIST OF REFERENCE NUMERALS 1 drive system, drive package
3 motor
5 first connection clutch
7 second connection clutch
9 hydrodynamic coupling, turbo-coupling
11 brake
13 transmission
14 connection clutch
15 rocker
17 fastener
19 motor-side axial end of the rocker
21 damper
25 central bolt
27 main mass
28 X-direction of the damper
29 Y-direction of the damper
30 Z-direction of the damper
31 stand
33 stand base plate
35 stand stay
37 end plate
41 torque arm
43 input element
45 first axis
47 connecting element
49 fastener
51 second axis
53 damping sleeve, elastomer sleeve
55 output element

The invention claimed is:

1. A drive system for a conveyor system, the drive system comprising:
a motor and a transmission connected to said motor; and
a damper disposed at an axial motor-side end of the drive system, said damper having a total mass that is less than 10% of a mass of the drive system without said damper.

2. The drive system according to claim 1, comprising a torque arm supporting said motor and said transmission.

3. The drive system according to claim 1, wherein said damper is tuned, or to be tuned, to different damper eigenfrequencies in at least two different spatial directions.

4. The drive system according to claim 3, wherein the at least two different spatial directions are a vertical direction and a horizontal direction.

5. The drive system according to claim 1, wherein the total mass of said damper is less than 5% of the mass of the drive system without said damper.

6. The drive system according to claim 1, wherein said damper has a planar support in order to prevent tilting moments.

7. The drive system according to claim 6, comprising a stand for said planar support.

8. The drive system according to claim 1, comprising a rocker for supporting and fixing said motor and said transmission, wherein said damper is arranged at a motor-side end of said rocker.

9. The drive system according to claim 8, wherein said rocker is formed with a stand at the motor-side end, said stand having a horizontally/axially oriented stand base plate for planar support of said damper.

10. The drive system according to claim 1, wherein the damper is supported in a vertical direction by at least one stay.

11. The drive system according to claim 1, wherein said damper comprises an elastomer with a hardness of 25 to 95 Shore.

12. The drive system according to claim 11, wherein the hardness of said elastomer is 70 to 80 Shore.

13. The drive system according to claim 1, wherein a damping ratio lies in a range from 0.04 to 0.16.

14. The drive system according to claim 13, wherein the damping ratio lies between 0.7 and 0.15.

15. The drive system according to claim 1, wherein said damper comprises an elastomer with a hardness of 25 to 95 Shore.

16. A drive system for a conveyor system, the drive system comprising:
a motor and a transmission connected to said motor; and
a damper disposed at an axial motor-side end of the drive system, said damper being formed of an elastomer with a hardness of 25 to 95 Shore.

17. The drive system according to claim 16, wherein said damper is tuned to different damper eigenfrequencies in at least two different spatial directions.

18. A method for reducing vibrations of a drive system, the drive system having a motor and a transmission connected to the motor, the method comprising:
   determining horizontal and vertical eigenfrequencies of the drive system; and
   fixing a damper, tuned to the vertical and horizontal eigenfrequencies of the drive system or to an operating frequency, to a motor-side end of the drive system, wherein a total mass of the damper is less than 10% of a mass of the drive system without the damper.

19. A drive system for a conveyor system, the drive system comprising:
   a motor and a transmission connected to said motor; and
   a damper disposed at an axial motor-side end of the drive system, said damper having a damping ratio between 0.04 and 0.16.

* * * * *